Figure 1:
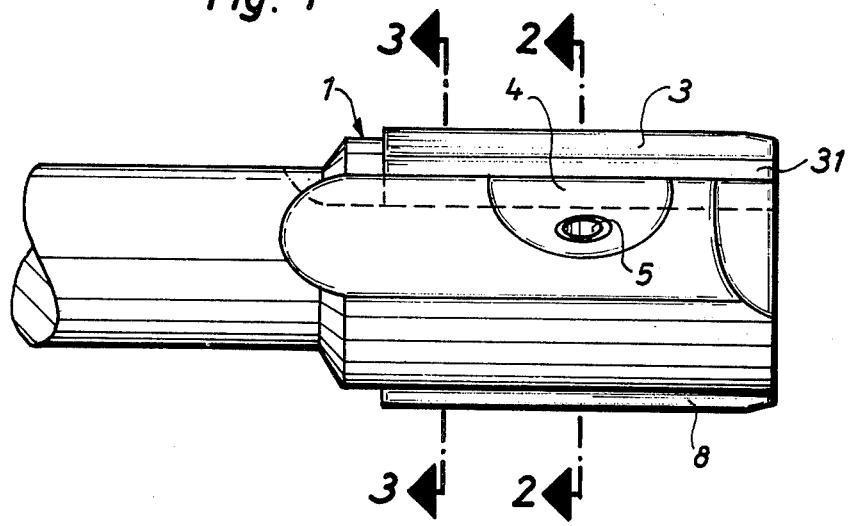

United States Patent [19]
Kress

[11] 4,125,342
[45] Nov. 14, 1978

[54] CLAMPING ARRANGEMENT FOR THE REPLACEABLE BLADE OF A ROTARY CUTTING TOOL

[75] Inventor: Dieter Kress, Aalen, Fed. Rep. of Germany

[73] Assignee: MAPAL Fabrik für Präzisionswerkzeuge Dr. Kress KG, Aalen, Fed. Rep. of Germany

[21] Appl. No.: 783,968

[22] Filed: Apr. 4, 1977

[30] Foreign Application Priority Data

Apr. 5, 1976 [DE] Fed. Rep. of Germany ....... 2614599

[51] Int. Cl.² ...................... B23B 27/16; B23B 29/02
[52] U.S. Cl. .................... 408/179; 408/185; 408/233; 407/45; 407/49; 407/87; 407/120
[58] Field of Search ......................... 29/105 R, 105 A; 408/179, 181, 183, 185, 233, 161; 407/45, 49, 87, 94, 108, 120

[56] References Cited

U.S. PATENT DOCUMENTS

| | | | |
|---|---|---|---|
| 2,227,281 | 12/1940 | Smith | 408/233 |
| 3,229,350 | 1/1966 | Yogus | 29/105 A |
| 3,286,557 | 11/1966 | Rietzler et al. | 408/179 |
| 3,880,545 | 4/1975 | Kress | 408/153 |

FOREIGN PATENT DOCUMENTS

599,799 3/1948 United Kingdom .................. 29/105 R

*Primary Examiner*—Leonidas Vlachos
*Attorney, Agent, or Firm*—Hans Berman

[57] ABSTRACT

The rotating cutter head of a reamer is formed with a recess, open in a radially outward direction and one circumferential direction relative to the axis of rotation, and a blade is retained in the recess between opposite, radially extending faces of the head and of a clamping shoe that may be adjusted inward of the recess. Two face portions of the blade are engaged by the respective faces of the head and shoe in area contact in planes which converge in a radially outward direction at a small acute angle to prevent movement of the blade from an initial, radially adjusted position under cutting stress.

4 Claims, 3 Drawing Figures

CLAMPING ARRANGEMENT FOR THE REPLACEABLE BLADE OF A ROTARY CUTTING TOOL

This invention relates to rotary cutting tools, and particularly to a tool having a replaceable blade for forming a bore of precise diameter in a workpiece.

The invention will be described hereinbelow in its application to a reamer, but other applications will readily suggest themselves to those skilled in the art.

It is known to provide the rotating cutter head of a reamer with an axially elongated recess in which a blade is releasably secured between a circumferentially directed face of the head and an opposite face of a clamping shoe which may be moved inward of the recess by a screw. The edge of the blade projects radially from the recess, and its position determines the diameter of a bore whose wall is cut by the rotating tool.

Neither the clamping shoe nor radially adjustable abutments provided in the recesses of conventional cutter heads can hold the blade firmly enough in a desired position to avoid a slight movement of the blade in the recess when very great working stresses are first applied to the adjusted blade. When extreme precision of the formed bore is essential, the cutting operation must be interrupted, and the blade adjusted after a short initial working period. This is at best inconvenient, particularly in otherwise automatized tool operation.

It is a primary object of this invention to clamp a releasable blade in a cutter head of the type described with a force commensurate with the greatest cutting stresses that may be encountered, and thereby to prevent displacement of the clamped blade by such stresses.

With this object and others in view, as will presently become apparent, the two planes of contact defined by repective opposite faces of the clamping shoe and of the cutter head, and by two face portions of the blade which are engaged by the faces of the head and shoe converge in a radially outward direction at an acute angle. The pressure exerted by the clamping shoe and the opposite face of the cutter head on the blade thus has a strong radial component which is commensurate with the working stress to be encountered by the blade. The blade may be adjusted prior to working to a position which is not capable of being changed in normal operation thereafter.

In tools made from the materials presently available for the making of cutter heads and blades, the angle between the afore-mentioned planes of contact would be between approximately 4° and 8° for most reliable setting of the blade, if the blade is reversible.

Other features, additional objects, and many of the attendant advantages of this invention will readily be appreciated from the following description of a preferred embodiment when considered in connection with the appended drawing in which:

FIG. 1 shows a tool of the invention in fragmentary side elevation; and

Figure 2:
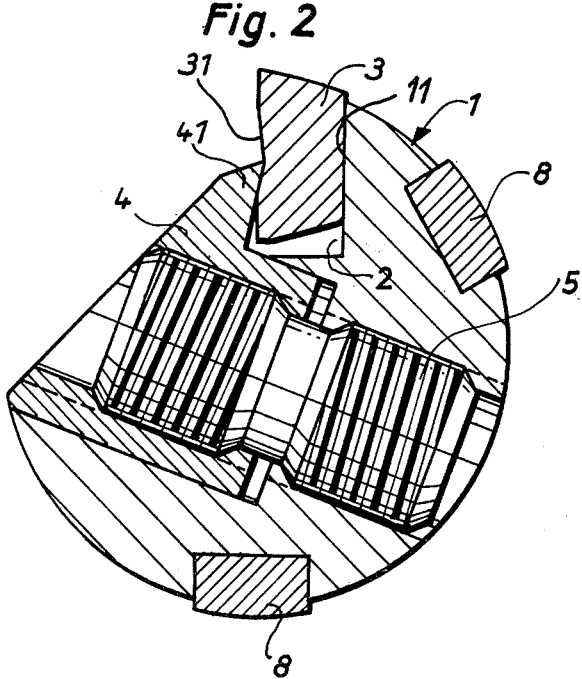
Figure 3:
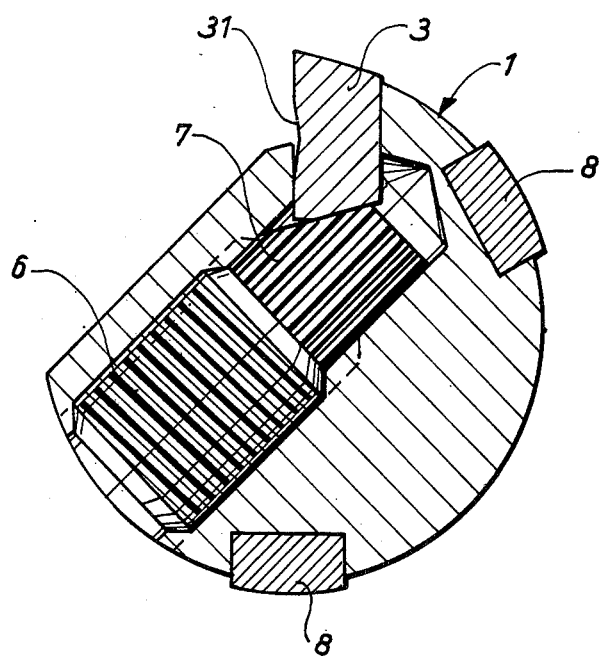

FIGS. 2 and 3 illustrate the tool of FIG. 1 in respective sections on the lines 2—2 and 3—3.

The illustrated tool is a reamer of the general type disclosed in may earlier U.S. Pat. No. 3,880,545. Only the portions of the tool necessary for an understanding of the invention are illustrated.

The cutter head 1 of the reamer has an integral shaft by means of which it may be turned about its axis. The generally cylindrically arcuate circumference of the cutter head 1 about its axis of rotation has a recess 2 which is open in a radially outward direction and in one circumferential direction and receives an elongated, reversible cutting blade 3 whose cross section is uniform over almost the entire length of the blade. The cross section of the blade, best seen in FIG. 2, has the approximate shape of an isoceles trapezoid, the longer base of the trapezoid being bounded by the two cutting edges of the blade, and the height of the trapezoid being smaller than the shorter base. One of the cutting edges radially projects from the recess 2, and the other edge is received in the recess so that a freshly ground edge may be presented to a workpiece by inverting the blade after the initially exposed edge has been dulled.

The circumferentially open side of the recess 2 is bounded by a clamping shoe 4 which may be moved inward of the recess by a screw 5 having right-hand and left-hand threads respectively mating with threads in a bore of the shoe 4 and of the cutter head 1. The blade 3 is backed in a radially inward direction by two, axially spaced, wedge-shaped abutment members 7 which project into the recess 2 and may be shifted by means of respective set screws 6 accessible in bores of the cutter head. Two axially elongated guide ribs 8 project from the cylindrical circumference of the head 1.

The reamer described so far is know from my earlier patent and too well understood to require more detailed description of its structure and operation. The blade 3 is clamped between respective, radially extending faces of the cutter head 1 and of the clamping shoe 4. The clamping face of the head 1 engages the planar face of the blade 3 defined by the smaller base of the trapezoid shown in FIG. 2.

The face of the blade defined by the greater base of the trapezoid is formed with a shallow groove 31 extending over the entire length of the blade 3 and bounded by planar face portions of the blade which are angularly of approximately 164° to 172° at an obtuse angle and meet in the median plane of symmetry of the blade which is parallel to the two cutting edges and equidistant from the same.

The planar face portion which provides the wall of the groove 31 nearer the axis of rotation is engaged in area contact by a matching face of the engagement portion 41 of the clamping shoe 4. One plane of contact is thus defined by the smaller base of the trapezoidal section of the blade 3 and the cooperating face of the cutter head 1, and another plane of contact is defined by the face of the shoe portion 41 engaging the blade 3 and by the engaged face portion of the blade. The two planes converge in a radially outward direction at an acute angle.

When the clamping shoe 4 is manually moved inward of the recess 2 by the screw 5 as far as possible while the blade engages the abutment members 7, the contact pressure between the blade and the abutment members is extremely high due to the wedge effect of the inclined planes of contact, and cutting stresses, even in very hard workpieces, cannot further displace the blade 3.

The acute angle defined by the planes of contact has an optimum value which is determined by specific dimensional properties of the tool and by properties of the materials which constitute the cutter head and associated elements, also the work-piece. Coefficients of friction and pitch of the threads on the screw 5 are merely representative of such properties. For all materials of construction now in common use for tools of the type described and for most materials that can be worked by such tools, the optimum acute angle for the planes of contact should be selected between approximately 4° and approximately 8° if the tool employs a reversible blade of symmetrical configuration, as illustrated. The sum of the obtuse angle of the walls bounding the groove 31 and the acute angle thus will be approximately 180° if it is intended to retain the advantages of this invention after the blade 3 has been reversed.

It should be understood, of course, that the foregoing disclosure relates only to a preferred embodiment, and that it is intended to cover all changes variations of the example of the invention herein chosen for the purpose of the disclosure which do not constitute departures from the spirit and scope of the invention set forth in the appended claims.

What is claimed is:

1. In a tool including a cutter head; drive means for rotating said head about an axis, a face of said head circumferentially bounding a recess in said head, said recess being open in one circumferential direction and a radially outward direction; a clamping shoe having a face opposite said face of said head and bounding said recess in said one circumferential direction; adjusting means for circumferentially moving said shoe inward of said recess; and a reversible blade retained in said recess by engagement of respective first and second face portions of said blade with said faces of said shoe and of said head respectively, the improvement which comprises:
   (a) said face portions and the engaged respective faces of said head and of said shoe defining two planes of contact,
   (b) said planes converging in a radially outward direction at an acute angle,
   (c) said blade having an axially extending first cutting edge radially projecting from said recess and a second cutting edge parallel to said first edge and received in said recess,
   (d) said edges defining a median plane of symmetry of said blade equidistant from and parallel to said edges,
   (e) said blade having a third face portion,
   (f) said first and third face portions being planar and symmetrical relative to said median plane and angularly offset from each other to define an elongated groove in said blade,
   (g) said groove being parallel to said cutting edges.

2. In a tool as set forth in claim 1, said angle being between approximately 4° and approximately 80°.

3. In a tool as set forth in claim 2, said first and third face portions constituting the walls of a groove in said blade and defining therebetween an obtuse angle of approximately 164° to approximately 172°.

4. In a tool as set forth in claim 1, a portion of said face of said shoe being contiguously adjacent said median plane.

* * * * *